Nov. 8, 1938.　　　J. ROSENQUIST　　　2,135,847

FISHLINE SINKER

Filed Oct. 16, 1937

INVENTOR
John Rosenquist
BY
Fred C. Matheny
ATTORNEY

Patented Nov. 8, 1938

2,135,847

UNITED STATES PATENT OFFICE 2,135,847

FISHLINE SINKER

John Rosenquist, Seattle, Wash.

Application October 16, 1937, Serial No. 169,381

3 Claims. (Cl. 43—52)

This invention relates to sinkers for fishing lines and the primary object of this invention is to provide a sinker which is very quickly and easily attached to or detached from a fishing line without necessitating the threading of the line through any holes or openings in the sinker.

Another object is to provide a sinker which is readily adjustable into various positions along a fishing line and one which will be loosened from the line and allowed to slide freely along the line as soon as a fish exerts a jerk or sharp pull on the line.

A more specific object is to provide a fishing line sinker having a line receiving clip or member formed of a piece of wire comprising a substantially straight central section, two open spiral portions of substantially one and one half turns each at the ends of the central section, and two end portions extending at right angles from the central section and the spirals and embedded in the sinker, said central section and spirals permitting a fish line to be quickly and easily engaged therewith or disengaged therefrom without threading the line through openings.

Another object is to provide fish line holding means of this nature which is especially well adapted for use in connection with a sinker that is provided with friction means for releasably gripping the fish line so that the sinker may be released on the line and allowed to slide down along the line toward the hooks when the line is being reeled in, said sinker being automatically released by the pull of a fish leaving the line clear for reeling in the fish.

In trolling for salmon and like fish it is common practice for a fisherman to carry from six to eight different sizes of sinkers and to change these sinkers frequently on the line until he ascertains the best depth at which to fish. The fish will be found at different depths at different hours of the day and at different depths in different locations and different kinds of fish will be found at different depths. This necessitates frequent changing of the sinkers on the line. Sinkers constructed in accordance with my invention can be quickly and easily connected with or disconnected from the line without disconnecting the line from the hooks thus saving much time and labor in the manipulation of the sinkers. Also sinkers used in this type of fishing are usually attached to the line at a distance of from fifteen to twenty feet from the hooks and are usually connected with the line by friction means which will release the sinker on the line when a fish strikes or becomes hooked and permit the sinker to slide down the line toward the hooks. Providing for the release of the sinker on the line when a fish is hooked and the sliding of the sinker down along the line to the location of the hooks gets the sinker out of the way so that the line may be reeled in substantially up to the hooks. This is not possible if the sinker is fixedly secured to the line at a distance of fifteen to twenty feet from the hooks. My line guiding means for detachably receiving and guiding the line is especially well adapted for use on a sinker which is secured to the line by friction means.

Other and more specific objects of this invention will be apparent from the following description taken in connection with the accompanying drawing.

In the drawing Fig. 1 is a top plan view of a fishing line sinker constructed in accordance with this invention showing a fishing line connected therewith.

Like reference numerals designate parts throughout the several views.

Figure 1:
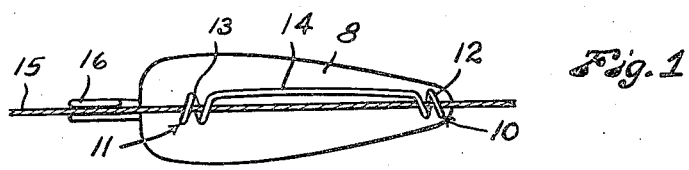
Figure 2:
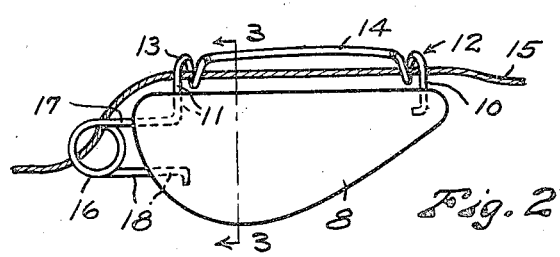
Fig. 2 is a side elevation of the same.
Figure 3:
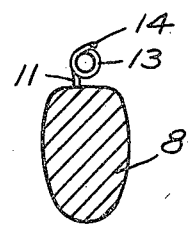
Fig. 3 is a sectional view substantially on broken line 3—3 of Fig. 2.

Referring to the drawing, 8 designates a sinker preferably of lead and of substantially the shape shown. The sinker 8 is provided on one edge with releasable line guiding means and on one end with frictional line holding means. I have illustrated the line guiding means and line holding means as both formed of a single piece of wire but obviously they may be separately made. The line guiding means comprises two end portions 10 and 11 embedded in the body of the sinker 8 and extending outwardly at substantially right angles to the sinker. Two spiral loops 12 and 13 are bent in the line guiding member adjacent the respective end portions 10 and 11 and the two spiral loops 12 and 13 are connected with each other by a substantially straight section 14. The two spiral loops 12 and 13 preferably each comprise slightly more than one complete turn in the wire and these spiral loops are each wound with an open coil and form an efficient guide for a fish line 15 when the fish line is positioned therein as shown in Figs. 1 and 2.

Figure 4:
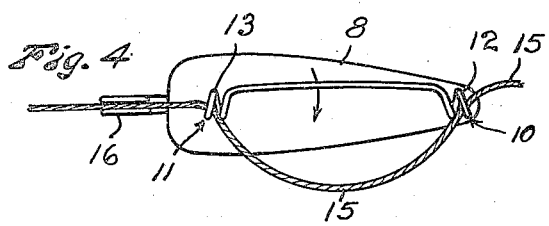
Figs. 4 and 5 are plan views illustrating two different positions which the fishing line will usually be passed through in inserting it in or removing it from the line guiding portion of the sinker.
Figure 5:
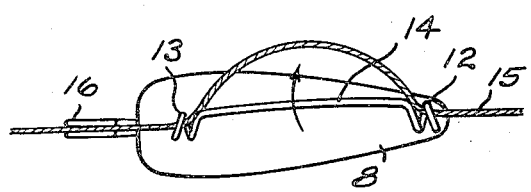

To place the fish line 15 in the line guiding member a portion or loop of the line is first passed through the space between the straight section 14 and adjacent edge of the sinker, in the direction shown by the arrow in Fig. 4, with the line positioned alongside the end portions 10 and 11. The loop portion is then passed over the straight section 14 in the direction shown by the arrow in Fig. 5, into a position as shown in Fig. 5, thus drawing the line into the loops 12 and 13 and when the line is then drawn straight it will pass straight through the loops 12 and 13 as shown in Fig. 1. To unfasten the line it is passed in a reverse direction first over and then under the straight section 14. The line will not accidentally become displaced from the loops 12 and 13 but is very quickly and easily engaged with or disengaged from said loops by a person who is familiar with the manner of engagement and disengagement of the same.

The line holding means comprises a spring clip formed of substantially one and one half turns of wire bent in the shape of a closed coil 16 and positioned adjacent an end of the sinker with the two end portions 17 and 18 of the wire which are connected with said closed coil embedded in the sinker. In Fig. 2, I have shown the line holding member and the line guiding member as formed of a single piece of wire. In this instance the end portions 11 and 17 are integrally connected with each other. Obviously the line guiding means and the line gripping means may be separate pieces. The line 15 is inserted between the two portions of the coil 16 and the sinker is thus frictionally secured to the line tightly enough so that it will not move on the line in ordinary trolling. However the line will be pulled out of the coil 16 when a fish becomes hooked thus allowing the sinker to run down the line to a location near the hook where the sinker will tend to keep the fish on the hook from jumping out of the water and will be out of the way when the line is being reeled in for landing the fish.

Figure 7:
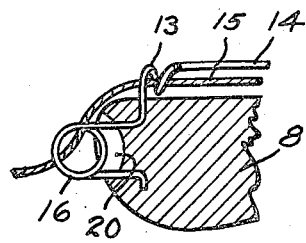
Fig. 7 is a fragmentary sectional view of another modified form of the invention.

In Fig. 7, I show a recess 20 in the end of the sinker 8 and show the coil 16 positioned close to the sinker body and extending slightly into said recess. When the coil 16 is positioned as shown in Fig. 7, it prevents fouling of the line in this coil due to getting the line drawn through said coil.

Figure 6:
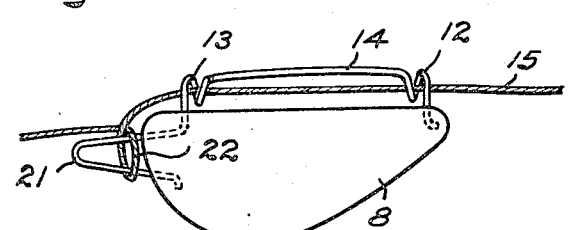
Fig. 6 is a side elevation of a modified form of the invention.

In Fig. 6, I show a modified form of the invention in which the coil 16 is replaced by a member 21 formed by extending a doubled portion of the wire outwardly from the end of the sinker. Preferably this doubled portion is tapered slightly, as shown. When the doubled portion 21 is used the line 15 is given a half hitch 22 around said doubled portion and this will effectively secure the sinker to the line as long as the weight of the sinker is supported on that portion of the line which passes through the guiding means 13—12. The hook is attached to that portion of the line 15 shown to the left of the sinker 8 in Fig. 6, and when a pull is exerted by a fish on the hook the half hitch 22 will be slipped off of the member 21, provided that the line on the other side of the sinker is slack. As long as the line shown to the right of the sinker in Fig. 6, is taut the half hitch will remain on the member 21. This makes it possible for the fisherman to control the release of the sinker when he has a fish on the line. The line guiding means in Fig. 6, is the same as the line guiding means shown in Figs. 1 to 5.

The foregoing description and accompanying drawing clearly disclose a preferred embodiment of my invention but it will be understood that this disclosure is merely illustrative and that such changes in the invention may be made as are fairly within the scope and spirit of the following claims.

I claim:

1. A device of the class described, comprising a sinker, two spaced apart wire post portions rigid with said sinker and extending at substantially right angles therefrom, two spiral loops of more than one complete turn each connected with said wire post portions and positioned at one side of the sinker, and a connecting portion connecting said spiral loops and spaced from the side of the sinker whereby a fish line may be passed therearound, the convolutions of said spiral loops being spaced apart whereby a fishing line may be passed between said convolutions into and out of said spiral loops.

2. A device of the class described, comprising a sinker, two spaced apart wire post members rigid with said sinker and extending outwardly therefrom and positioned near the opposite ends of the sinker, two spiral wire loops of substantially one and one half turns each integral with the respective post members, and a substantially straight portion integral with said loops connecting said loops and spaced from said sinker, said loops being positioned in close proximity to said sinker and being substantially aligned with each other and the convolutions of said loops being spaced apart whereby a fishing line may be passed between said convolutions into and out of said spiral loops.

3. Fishing line guiding means for use in connection with a sinker for releasably receiving a portion of a fishing line remote from the ends of said line, comprising two spaced apart spiral loops of wire each wound in excess of one complete turn with the convolutions of each loop spaced apart, a connecting member connecting said two loops and spaced from the side of the sinker whereby a portion of a fish line remote from the ends may be passed around said connecting member and into or out of the convolutions of said loops, end post portions connected with said loops and extending at substantially right angles to said loops and secured to the sinker, and friction clip fishing line gripping means connected with an end portion of said sinker.

JOHN ROSENQUIST.